United States Patent
Huang et al.

(10) Patent No.: US 10,299,179 B2
(45) Date of Patent: May 21, 2019

(54) SELECTION AND RESELECTION PARAMETER DETERMINATION METHOD, BASE STATION, TERMINAL, SYSTEM AND STORAGE MEDIUM

(71) Applicant: ZTE CORPORATION, Shenzhen, Guangdong Province (CN)

(72) Inventors: He Huang, Shenzhen (CN); Yuanfang Yu, Shenzhen (CN); Zhongda Du, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 257 days.

(21) Appl. No.: 15/305,873

(22) PCT Filed: Aug. 8, 2014

(86) PCT No.: PCT/CN2014/084028
§ 371 (c)(1),
(2) Date: Nov. 22, 2016

(87) PCT Pub. No.: WO2015/161585
PCT Pub. Date: Oct. 29, 2015

(65) Prior Publication Data
US 2017/0070931 A1    Mar. 9, 2017

(30) Foreign Application Priority Data

Apr. 24, 2014   (CN) .......................... 2014 1 0168164

(51) Int. Cl.
*H04W 36/08*   (2009.01)
*H04W 36/36*   (2009.01)
(Continued)

(52) U.S. Cl.
CPC ........... *H04W 36/08* (2013.01); *H04W 36/36* (2013.01); *H04W 48/18* (2013.01); *H04W 48/12* (2013.01); *H04W 88/02* (2013.01)

(58) Field of Classification Search
CPC ..... H04W 36/08; H04W 36/36; H04W 48/18; H04W 36/0061; H04W 36/165
See application file for complete search history.

(56) References Cited

U.S. PATENT DOCUMENTS

| 2012/0322446 | A1  | 12/2012 | Ramachandran et al. |
| 2013/0183971 | A1* | 7/2013  | Tamaki ............. H04W 36/0061 455/436 |
| 2013/0210422 | A1* | 8/2013  | Pani ...................... H04W 48/16 455/423 |

FOREIGN PATENT DOCUMENTS

| CN | 101222759 A | 7/2008 |
| CN | 101365163 A | 2/2009 |

(Continued)

OTHER PUBLICATIONS

Extended European Search Report dated Mar. 22, 2017 for European Patent Application No. 14890138.2.

(Continued)

*Primary Examiner* — Anez C Ebrahim
(74) *Attorney, Agent, or Firm* — Plumsea Law Group, LLC

(57) ABSTRACT

The present invention discloses a method for determining cell selection and reselection parameters, a base station, a terminal and a system, and relates to the field of communication. The method for determining cell selection and reselection parameters includes: setting at least two sets of cell selection and reselection parameters according to a terminal capability parameter, and sending the at least two sets of cell selection and reselection parameters, wherein, one set of cell selection and reselection parameters, which matches with the terminal capability parameter of a terminal, of the at least two sets of cell selection and reselection parameters is used (Continued)

for cell selection and/or reselection of the terminal. The present invention further discloses a computer storage medium.

21 Claims, 4 Drawing Sheets

(51) Int. Cl.
*H04W 48/18* (2009.01)
*H04W 88/02* (2009.01)
*H04W 48/12* (2009.01)

(56) References Cited

FOREIGN PATENT DOCUMENTS

| EP | 2111074 A1 | 10/2009 |
|----|------------|---------|
| WO | 2009141009 A1 | 11/2009 |
| WO | 2009/149600 A1 | 12/2009 |

OTHER PUBLICATIONS

International Search Report and Written Opinion dated Feb. 3, 2015 in PCT Application No. PCT/CN2014/084028.

\* cited by examiner

SELECTION AND RESELECTION PARAMETER DETERMINATION METHOD, BASE STATION, TERMINAL, SYSTEM AND STORAGE MEDIUM

CROSS-REFERENCE TO RELATED APPLICATION(S)

This application is the U.S. National Phase application of PCT application number PCT/CN2014/084028 having a PCT filing date of Aug. 8, 2014, which claims priority of Chinese patent application 201410168164.5 filed on Apr. 24, 2014, the disclosures of which are hereby incorporated by reference.

TECHNICAL FIELD

The present document relates to a cell reselection technology in the field of communication, in particular to a method for determining selection and reselection parameters, a base station, a terminal, a system and a storage medium.

BACKGROUND OF RELATED ART

With the flourishing development of communication technologies, the 2G communication technology, the 3G communication technology, the 4G communication technology, and the like emerge; and there are different communication systems in each generation of communication technology and different communication demands of customers are greatly satisfied. At the same time, various types of communication terminals emerge also. Different communication terminals have different communication capabilities and work at different communication systems to provide different communication serves for users. However, in the existing communication process, it is found that the capabilities of the communication terminals often cannot be effectively exerted, which results in the problems such as low communication transmission efficiency, low data transmission rate and low user satisfaction.

SUMMARY OF THE INVENTION

In view of this, the present document expects to provide a method for determining cell selection and reselection parameters, a base station, a terminal, a communication system and a computer storage medium, so as to better exert communication capabilities of terminals and improve communication quality and user satisfaction.

In order to achieve the above-mentioned purposes, the technical solutions of the embodiments of the present document are implemented as follows:

In a first aspect, the embodiment of the present document provides a method for determining cell selection and reselection parameters, comprising:

setting at least two sets of cell selection and reselection parameters according to a terminal capability parameter; and sending the at least two sets of cell selection and reselection parameters, wherein, one set of cell selection and reselection parameters, which matches with the terminal capability parameter of a terminal, of the at least two sets of cell selection and reselection parameters is used for cell selection and/or reselection of the terminal.

Preferably, sending the at least two sets of cell selection and reselection parameters comprises:

bearing the at least two sets of cell selection and reselection parameters in an RRC message for sending.

Preferably, the RRC message is an RRC reconfiguration message, an RRC release message, an RRC connection establishment reject message or a system message.

Preferably, setting at least two sets of cell selection and reselection parameters according to a terminal capability parameter comprises:

presetting at least one piece of configuration index information, wherein each piece of configuration index information comprises at least one configuration index, and one configuration index corresponds to one terminal capability parameter;

preconfiguring one set of cell selection and reselection parameters according to each piece of configuration index information; and when the terminal capability parameter corresponds to at least one configuration index in one piece of configuration index information, determining the one set of cell selection and reselection parameters corresponding to the configuration index information as one of the at least two sets of cell selection and reselection parameters;

or when terminal capability parameters correspond to all configuration indexes in one piece of configuration index information, determining one set of cell selection and reselection parameters corresponding to the configuration index information as one of the at least two sets of cell selection and reselection parameters.

Preferably, the configuration index information is bitmaps; and one or more bits in each bitmap is the configuration index corresponding to one terminal capability parameter.

Preferably, setting at least two sets of cell selection and reselection parameters according to a terminal capability parameters comprises:

presetting one or more sets of cell selection and reselection parameters according to different terminal capability parameters or a terminal capability parameter set, wherein the terminal capability parameter set comprises at least one terminal capability parameter;

containing a corresponding relation between the terminal capability parameters and the cell selection and reselection parameters in a communication protocol; and determining the at least two sets of cell selection and reselection parameters according to the communication protocol;

correspondingly, sending the at least two sets of cell selection and reselection parameters comprises:

sending the preconfigured at least two sets of cell selection and reselection parameters according to the communication protocol.

Preferably, forming indication information, wherein the indication information is used for indicating the terminal capability parameter corresponding to each set of cell selection and reselection parameters; and sending the indication information.

Preferably, the method further comprises:

sending default cell selection and reselection parameters, wherein, the default cell selection and reselection parameters are cell selection and reselection parameters configured not according to the terminal capability parameter.

Preferably, setting different cell selection and reselection parameters according to a terminal capability comprises:

setting the at least two sets of cell selection and reselection parameters according to at least one of the following terminal capability parameters;

the terminal capability parameters comprise:

whether the terminal supports a carrier aggregation or not, frequency bands of carrier aggregation supported by the terminal, capability grades of the terminal, whether the terminal supports a dual connectivity or not, a version of a communication protocol supported by the terminal, whether the terminal supports multi-input and multi-output or not, categories of multi-input and multi-output supported by the terminal, frequency bands of multi-input and multi-output supported by the terminal, whether the terminal supports coordinated multi-point (COMP) transmission or not, whether the terminal supports a 3GPP/WLAN interoperation or not, whether the terminal is a special terminal defined in the communication protocol or not and whether the terminal has a special capability defined in the communication protocol.

Preferably, the cell selection and reselection parameters are parameters defined in the communication protocol and for the cell selection and/or reselection by the terminal, and comprise at least one of the following:

a candidate frequency point list, a frequency point priority, a minimum receiving RSRP threshold, a minimum receiving RSRQ threshold, a higher priority selection threshold, a lower priority selection threshold, a speed state factor, a candidate cell list, a access barred cell list, cell access permission information, an offset aiming at a frequency point and an offset aiming at a cell.

In a second aspect, the embodiment of the present document provides a method for determining cell selection and reselection parameters, comprising:

receiving at least two sets of cell selection and reselection parameters;

selecting one set of cell selection and reselection parameters, which matches with a first terminal capability parameter, from the at least two sets of cell selection and reselection parameters as first cell selection and reselection parameters, wherein, the first terminal capability parameter is a terminal capability parameter of a terminal;

the first cell selection and reselection parameters are used for cell selection and/or reselection of the terminal.

Preferably, receiving at least two sets of cell selection and reselection parameters comprises:

receiving an RRC message; and acquiring the at least two sets of cell selection and reselection parameters from the RRC message.

Preferably, the RRC message is an RRC reconfiguration message, an RRC release message, an RRC connection establishment reject message or a system message.

Preferably, the method further comprises:

receiving indication information, wherein the indication information is used for indicating the terminal capability parameter corresponding to each set of cell selection and reselection parameters; and selecting one set of cell selection and reselection parameters, which matches with a first terminal capability parameter, from the at least two sets of cell selection and reselection parameters as the first cell selection and reselection parameters comprises:

determining a second terminal capability parameter corresponding to each set of cell selection and reselection parameters according to the indication information; and matching second terminal capability parameters with the first terminal capability parameter, wherein, one set of cell selection and reselection parameters corresponding to the second terminal capability parameter which is in the second terminal capability parameters and successfully matches with the first terminal capability parameter, is the first cell selection and reselection parameters.

Preferably, the second terminal capability parameters and the first terminal capability parameter comprise at least one of:

whether the terminal supports a carrier aggregation or not, frequency bands of carrier aggregation supported by the terminal, capability grades of the terminal, whether the terminal supports a dual connectivity or not, a version of a communication protocol supported by the terminal, whether the terminal supports multi-input and multi-output or not, categories of multi-input and multi-output supported by the terminal, frequency bands of multi-input and multi-output supported by the terminal, whether the terminal supports coordinated multi-point (COMP) transmission or not, whether the terminal supports a 3GPP/WLAN interoperation or not, whether the terminal is a special terminal defined in the communication protocol or not and whether the terminal has a special capability defined in the communication protocol.

Preferably, each set of cell selection and reselection parameters are parameters defined in a communication protocol and for the cell selection and/or reselection by the terminal, and comprises at least one of:

a candidate frequency point list, a frequency point priority, a minimum receiving RSRP threshold, a minimum receiving RSRQ threshold, a higher priority selection threshold, a lower priority selection threshold, a speed state factor, a candidate cell list, a access barred cell list, cell access permission information, an offset aiming at a frequency point and an offset aiming at a cell.

Preferably, the method further comprises:

receiving default cell selection and reselection parameters, wherein the default cell selection and reselection parameters are cell selection and reselection parameters configured not according to the terminal capability parameter; and when there is no cell selection and reselection parameters matching with the first terminal capability parameter in the at least two sets of cell selection and reselection parameters, selecting the default cell selection and reselection parameters as the cell selection and reselection parameters of the terminal.

In a third aspect, the embodiment of the present document provides a method for determining cell selection and reselection parameters, comprising:

a base station setting at least two sets of cell selection and reselection parameters according to a terminal capability parameter;

the base station sending the at least two sets of cell selection and reselection parameters;

a terminal receiving the at least two sets of cell selection and reselection parameters; and the terminal selecting one set of cell selection and reselection parameters, which matches with a first terminal capability parameter, from the at least two sets of cell selection and reselection parameters as first cell selection and reselection parameters, wherein, the first terminal capability parameter is a terminal capability parameter of the terminal; and the first cell selection and reselection parameters are used for cell selection and/or reselection of the terminal.

Preferably, the method further comprises:

the base station further forming indication information, wherein the indication information is used for indicating the terminal capability parameter corresponding to each set of cell selection and reselection parameters;

the base station further sending the indication information; and the terminal further receiving the indication information; and the terminal selecting one set of cell selection and reselection parameters, which matches with a first terminal capability parameter, from the at least two sets of cell selection and reselection parameters as the first cell selection and reselection parameters comprises:

the terminal determining a second terminal capability parameter corresponding to each set of cell selection and reselection parameters according to the indication information; and the terminal matching second terminal capability parameters with the first terminal capability parameter, wherein, one set of cell selection and reselection parameters corresponding to the second terminal capability parameter which is in the second terminal capability parameters and successfully matches with the first terminal capability parameter, is the first cell selection and reselection parameters.

In a fourth aspect, the embodiment of the present document provides a base station, comprising:

a setting unit, configured to set at least two sets of cell selection and reselection parameters according to a terminal capability parameter; and a sending unit, configured to send the at least two sets of cell selection and reselection parameters, wherein, one set of cell selection and reselection parameters, which matches with the terminal capability parameter of a terminal, of the at least two sets of cell selection and reselection parameters is used for cell selection and/or reselection of the terminal.

Preferably, the sending unit is configured to bear the at least two sets of cell selection and reselection parameters in an RRC message for sending.

Preferably, the RRC message is an RRC reconfiguration message, an RRC release message, an RRC connection establishment reject message or a system message.

Preferably, the setting unit comprises:

a first configuration module, configured to preset at least one piece of configuration index information, wherein each piece of configuration index information comprises at least one configuration index, and one configuration index corresponds to one terminal capability parameter;

a second configuration module, configured to preconfigure one set of cell selection and reselection parameters according to each piece of configuration index information; and a determination module, configured to, when the terminal capability parameter corresponds to at least one or all configuration indexes in one piece of configuration index information, determine the one set of cell selection and reselection parameters corresponding to the configuration index information as one of the at least two sets of cell selection and reselection parameters.

Preferably, the configuration index information is bitmaps; and one or more bits in each bitmap is the configuration index corresponding to one terminal capability parameter.

Preferably, the setting unit comprises:

a third configuration module, configured to preset one or more sets of cell selection and reselection parameters according to different terminal capability parameters or a terminal capability parameter set, wherein the terminal capability parameter set comprises at least one terminal capability parameter;

a storage module, configured to store a corresponding relation between the terminal capability parameters and the cell selection and reselection parameters in a communication protocol; and a second determination module, configured to determine the at least two sets of cell selection and reselection parameters according to the communication protocol;

correspondingly, the sending unit is configured to send the preconfigured at least two sets of cell selection and reselection parameters according to the communication protocol.

Preferably, the base station further comprises:

a forming unit, configured to form indication information, wherein the indication information is used for indicating the terminal capability parameter corresponding to each set of cell selection and reselection parameters; and the sending unit is further configured to send the indication information.

Preferably, the sending unit sends default cell selection and reselection parameters, wherein, the default cell selection and reselection parameters are cell selection and reselection parameters configured not according to the terminal capability parameter.

Preferably, the setting unit is configured to set at least two sets of cell selection and reselection parameters according to at least one of the following terminal capability parameters;

the terminal capability parameters comprise:

whether the terminal supports a carrier aggregation or not, frequency bands of carrier aggregation supported by the terminal, capability grades of the terminal, whether the terminal supports a dual connectivity or not, a version of a communication protocol supported by the terminal, whether the terminal supports multi-input and multi-output or not, categories of multi-input and multi-output supported by the terminal, frequency bands of multi-input and multi-output supported by the terminal, whether the terminal supports coordinated multi-point (COMP) transmission or not, whether the terminal supports a 3GPP/WLAN interoperation or not, whether the terminal is a special terminal defined in the communication protocol or not and whether the terminal has a special capability defined in the communication protocol.

Preferably, the cell selection and reselection parameters are parameters defined in the communication protocol and for the cell selection and/or reselection by the terminal, and comprise at least one of the following:

a candidate frequency point list, a frequency point priority, a minimum receiving RSRP threshold, a minimum receiving RSRQ threshold, a higher priority selection threshold, a lower priority selection threshold, a speed state factor, a candidate cell list, a access barred cell list, cell access permission information, an offset aiming at a frequency point and an offset aiming at a cell.

In a fifth aspect, the embodiment of the present document provides a terminal, comprising:

a receiving unit, configured to receive at least two sets of cell selection and reselection parameters;

a selection unit, configured to select one set of cell selection and reselection parameters, which matches with a first terminal capability parameter, from the at least two sets of cell selection and reselection parameters as first cell selection and reselection parameters, wherein, the first terminal capability parameter is a terminal capability parameter of the terminal; and the first cell selection and reselection parameters are used for cell selection and/or reselection of the terminal.

Preferably, the receiving unit comprises:

a receiving module, configured to receive an RRC message; and an acquisition module, configured to acquire the at least two sets of cell selection and reselection parameters from the RRC message.

Preferably, the RRC message is an RRC reconfiguration message, an RRC release message, an RRC connection establishment reject message or a system message.

Preferably, the receiving unit is further configured to receive indication information, wherein the indication information is used for indicating the terminal capability parameter corresponding to each set of cell selection and reselection parameters; and the selection unit comprises:

a determination module, configured to determine a second terminal capability parameter corresponding to each set of cell selection and reselection parameters according to the indication information; and a matching module, configured to match second terminal capability parameters with the first terminal capability parameter, wherein, one set of cell selection and reselection parameters corresponding to the second terminal capability parameter which is in the second terminal capability parameters and successfully matches with the first terminal capability parameter, is the first cell selection and reselection parameters.

Preferably, the receiving unit is further configured to receive default cell selection and reselection parameters; and the selection unit is further configured to, when there is no cell selection and reselection parameters matching with the first terminal capability parameter in the at least two sets of cell selection and reselection parameters, select the default cell selection and reselection parameters as the cell selection and reselection parameters of the terminal.

Preferably, the second terminal capability parameters and the first terminal capability parameter comprise at least one of:

whether the terminal supports a carrier aggregation or not, frequency bands of carrier aggregation supported by the terminal, capability grades of the terminal, whether the terminal supports a dual connectivity or not, a version of a communication protocol supported by the terminal, whether the terminal supports multi-input and multi-output or not, categories of multi-input and multi-output supported by the terminal, frequency bands of multi-input and multi-output supported by the terminal, whether the terminal supports coordinated multi-point (COMP) transmission or not, whether the terminal supports a 3GPP/WLAN interoperation or not, whether the terminal is a special terminal defined in the communication protocol or not and whether the terminal has a special capability defined in the communication protocol.

Preferably, each set of cell selection and reselection parameters are parameters defined in a communication protocol and for the cell selection and/or reselection by the terminal, and comprises at least one of:

a candidate frequency point list, a frequency point priority, a minimum receiving RSRP threshold, a minimum receiving RSRQ threshold, a higher priority selection threshold, a lower priority selection threshold, a speed state factor, a candidate cell list, a access barred cell list, cell access permission information, an offset aiming at a frequency point and an offset aiming at a cell.

In a sixth aspect, the embodiment of the present document provides a communication system, comprising:

a base station, configured to set at least two sets of cell selection and reselection parameters according to a terminal capability parameter, and send the at least two sets of cell selection and reselection parameters;

a terminal, configured to receive the at least two sets of cell selection and reselection parameters, and select one set of cell selection and reselection parameters, which matches with a first terminal capability parameter, from the at least two sets of cell selection and reselection parameters as first cell selection and reselection parameters, wherein the first terminal capability parameter is a terminal capability parameter of the terminal; and the first cell selection and reselection parameters are used for cell selection and/or reselection of the terminal.

Preferably, the base station is further configured to form and send indication information; and the terminal is further configured to receive the indication information;

determine a second terminal capability parameter corresponding to each set of cell selection and reselection parameters according to the indication information; and match second terminal capability parameters with the first terminal capability parameter;

wherein, one set of cell selection and reselection parameters corresponding to the second terminal capability parameter which is in the second terminal capability parameters and successfully matches with the first terminal capability parameter, is the first cell selection and reselection parameters.

In a seventh aspect, the embodiment of the present document provides a computer storage medium, the computer storage medium storing computer-executable instructions, the computer executable instructions being used for executing at least one of the methods in the first aspect to the third aspect of the present document.

According to the cell selection and reselection parameter determination method, the base station, the terminal and the communication system provided by the embodiments of the present document, as compared to the prior art, since the base station sends at least two sets of cell selection and reselection parameters to facilitate the terminal to select one set of cell selection and reselection parameters more suitable for terminal communication according to the capabilities of the terminal to trigger and/or perform cell selection and/or reselection, obliviously the communication quality and user satisfaction are improved relative to a method of adopting reselection parameters, which are not suitable for terminal communication capabilities, for terminal cell reselection.

PREFERRED EMBODIMENTS OF THE INVENTION

Figure 1:
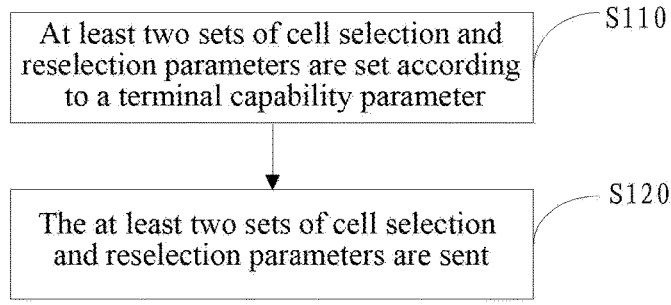
FIG. 1 illustrates a flowchart one of a method for determining cell selection and reselection parameters according to an embodiment of the present document.

The preferred embodiments of the present document will be described in detail below in combination with the drawings. It should be understood that the preferred embodiments described below are just used for illustrating and explaining the present document instead of limiting the present document.

With the development of communication technologies, various communication technologies such as a Long Term Evolution (LTE) communication technology emerge. The LTE is long term evolution of a Universal Mobile Telecommunications System (UMTS) formulated by the 3rd Generation Partnership Project (3GPP) organization. The LTE system introduces key transmission technologies such as Orthogonal Frequency Division Multiplexing (OFDM) and Multi-Input& Multi-Output (MIMO), and thereby the spectrum efficiency and the data transmission rate are obviously increased.

A first-stage technology of LTE was standardized at the end of 2008 and commercial network deployment was started in 2009 (corresponding to 3GPP R8/R9 versions, wherein R8 and R9 are two different kinds of communication protocols). In order to satisfy higher demands and more applications of future wireless communication market and further maintain better backward compatibility to LTE, 3GPP initiated a study on an evolved version LTE-Advanced (LTE-A) of LTE (corresponding to 3GPP R10 and subsequent versions). LTE-A adopts key technologies such as Carrier Aggregation, Enhanced UL/DL MIMO, Coordinated Multi-point Tx&Rx, Relay and Enhanced Inter-cell Interference Coordination for Heterogeneous Network, the peak data rate, the peak spectrum efficiency, the cell average spectrum efficiency and the cell boundary user performance of wireless communication system can be greatly improved, and the networking efficiency of the entire network can also be improved.

Due to parallel proceeding of commercial network deployment and LTE standard technology evolution, a situation that terminals which adopt different protocol versions and base stations which adopt different versions coexist widely exists in the market at present. In consideration of difference in functions of different protocol versions, devices based on different protocol versions are also greatly different in functions (even though based on the same protocol version, in consideration of factors such as manufacturing costs and target markets, different base stations and terminals may also be greatly different in supported functions), and maximum capability which can be exerted by the terminals under a certain base station depends on an intersection set between capabilities of the terminal and the base station. For example, compared to a base station based on the 3GPP R9 version technology, a base station based on the 3GPP R11 version technology, which adopts the R11 protocol version, can support functions such as carrier aggregation and 8×8 downlink MIMO/4×4 uplink MIMO, and can provide higher transmission rate and efficiency. However, these functions must match with the R11 terminal which supports these functions to be able to be effectively exerted. Since, according to current protocol description, the UE does not consider the matter of capability matching between terminals and base stations when making cell selection and reselection, the base station cannot configure different cell selection and reselection parameters for UEs having different capabilities, and the terminal cannot acquire specific capabilities of the base stations through system messages, thereby targeted residence cannot be realized according to capabilities of devices. If a great number of R9 terminals reside in a cell under an R11 base station or a great number of R11 terminals reside in a cell under an R9 base station, the capabilities of the devices cannot be effectively exerted due to mismatching between versions and capabilities of the terminals and the base stations, consequently the transmission efficiency and rate are decreased and greater negative influence is caused to user experience.

To sum up, the reason, which causes that the communication terminal cannot normally exert the communication capabilities and the communication quality is poor, is that the communication terminal resides in the cell which is not suitable for exerting the communication capabilities thereof. According to the above-mentioned analysis, the embodiments of the present document provide a cell selection and reselection parameter determination method based on terminal capabilities, a base station, a terminal and a communication system, so as to enable the terminal to reside in the cell adaptable to the communication capabilities of the terminal as much as possible, thereby improving communication quality and user satisfaction.

Embodiment 1

As shown in FIG. 1, the embodiment provides a method for determining cell selection and reselection parameters, which comprises:

In step S110, at least two sets of cell selection and reselection parameters are set according to terminal capability parameters;

In step 120, the at least two sets of cell selection and reselection parameters are sent.

Therein, one set of cell selection and reselection parameters, which matches a terminal capability parameter of a terminal, of the at least two sets of cell selection and reselection parameters are used for cell selection and/or reselection of the terminal.

In a specific implementation process, an executive subject for step S110 and step S120 usually may be a base station or a network element connected with the base station; and specifically the base station may be an evolved NodeB (eNB).

In step S110, a configuration device for configuring the cell selection and reselection parameters can pre-store terminal capability parameters of different terminals, and specifically the terminal capability parameters are acquired according to different communication protocols corresponding to different types of terminals. For example, according to statistic data, it is considered that terminals which are active in a coverage range of a first base station usually include three types of terminals; the base station A can acquire the terminal capability parameters of the above 3 different terminals in advance through manual input of management personnel or peripheral, and when configuring the cell selection and reselection parameters, configures three sets of cell selection and reselection parameters regarding the terminal capability parameters of the 3 different terminals.

After the cell selection and reselection parameters are configured, the base station A sends the three sets of cell selection and reselection parameters to all terminals in the coverage range of the base station A, such that a certain specific terminal selects one set of cell selection and reselection parameters according to the terminal capability parameter(s) of the terminal, so as to perform cell reselection, thereby residing or switching to a cell which is suitable for the terminal, to exert the communication capability of the communication terminal as much as possible and improve the communication quality and user satisfaction.

Usually, in a specific implementation process, the types of the terminals are limited and can be known in advance, thus the base station does not need to know the terminal capability parameters of a certain specific terminal when configuring the cell selection and reselection parameters; and the base station configures the cell selection and reselection parameters according to current network configuration parameters and the terminal capability parameters. The network configuration parameters comprise communication engineering parameters of a first cell formed under the coverage of the base station A and engineering parameters of a second cell. The second cell can be a neighboring cell of the first cell or a cell formed under different frequency coverages in the same geographical range.

Under the current communication situation, if the base station A finds that a type A terminal can better exert the communication capability of the communication terminal in the second cell, the base station A can configure one set of cell selection and reselection parameters, so as to enable the type A terminal residing in the first cell to be switched to the second cell after the terminal receives the cell selection and reselection parameters. When the reselection parameters are specifically configured, load parameters of all cells may also be comprehensively considered to perform load balancing processing, etc.

Specifically, the cell selection and reselection parameters are used for the cell selection and/or reselection of the terminal including: when the terminal enters a network for the first time, the cell selection and reselection parameters are used by the terminal to select a cell to reside; and when the terminal enters the network once again, the cell selection and reselection parameters are used for the cell reselection.

According to the method for determining the cell selection and reselection parameters provided by this embodiment, compared with the existing communication technology in which the base station configures uniformly one type of cell selection and reselection parameters for sending to the terminals, obviously the method provided by this embodiment is beneficial to the terminal selecting the cell selection and reselection parameter which is more suitable for exerting the communication capability of the terminal according to the capabilities of the terminal itself, thereby the terminal resides in the cell which is more suitable for the terminal, so as to improve the communication quality and the user satisfaction.

Preferably, the step S120 comprises:

bearing the at least two sets of cell selection and reselection parameters in an RRC message for sending.

The RRC is an abbreviation of Radio Resource Control; and the RRC message is a radio resource control protocol message and is a message which is used for establishing an RRC connection between a terminal and a base station in a communication process.

Preferably, the RRC message is an RRC reconfiguration message, an RRC release message, an RRC connection establishment reject message or a system message.

In a specific implementation process, the cell selection and reselection parameters can also be born in a system message or a dedicated message which is specially used for sending the cell selection and reselection parameters and are sent to the terminal; the terminal receives the cell selection and reselection parameters on the corresponding message.

By bearing the cell selection and reselection parameters in the RRC message for sending to the terminal, the implementation is simple and convenient, the times of information interaction between the base station and the terminal are reduced, and thus it is beneficial to decrease the load of the base station and the power consumption of the terminal.

Preferably, in the step S120, the cell selection and reselection parameters can also be sent by adopting broadcast, multicast or dedicated signaling.

For both the broadcast signal and the multicast signal, the base station sends the same signal to a plurality of terminals in one step; and the difference is that: the broadcast signal is sent to all terminals which can receive the signal and the multicast signal is sent to a plurality of designated terminals. By adopting a broadcast or multicast mode, it is beneficial to decrease the sending times of the base station and reduce the sending load of the base station.

The system message is the broadcast signaling, and the RRC message is the RRC reconfiguration message, the RRC release message or the RRC connection establishment reject message, i.e., the dedicated signaling.

Figure 2:
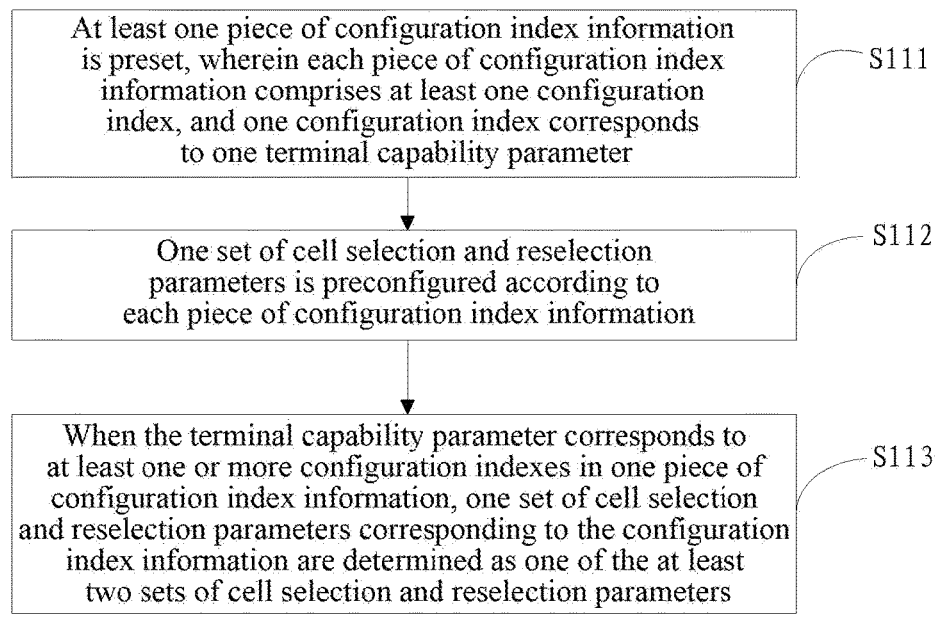
FIG. 2 illustrates a flowchart of forming cell selection and reselection parameters according to an embodiment of the present document.

As shown in FIG. 2, implementation modes of step S110 are various, and two preferred modes are provided below.

Mode 1:

Step S110 may comprise:

In step S111, at least one piece of configuration index information is preset, wherein each piece of configuration index information comprises at least one configuration index, and one configuration index corresponds to one terminal capability parameter;

In step S112, one set of cell selection and reselection parameters is preconfigured according to each piece of configuration index information;

In step S113, when the terminal capability parameters correspond to at least one or all configuration indexes in one piece of configuration index information, one set of cell selection and reselection parameters corresponding to the configuration index information is determined as one of the at least two sets of cell selection and reselection parameters.

In a specific execution process, when the terminal capability parameters correspond to all configuration indexes in one piece of configuration index information, one set of cell selection and reselection parameters corresponding to the configuration index information is determined as one of the at least two sets of cell selection and reselection parameters.

Specifically, for example, a terminal can correspond to two terminal capabilities and the two corresponding terminal capability parameters are respectively a terminal capability parameter 1 and a terminal capability parameter 2. In order to simplify expressions of the terminal capability parameter 1 and the terminal capability parameter 2, two configuration indexes can be set respectively for the terminal capability parameter 1 and the terminal capability parameter 2; the two configuration indexes form the configuration index information; one set of cell selection and reselection parameters is formed by comprehensively considering various terminal capability parameters in one piece of configuration index information; and when the cell selection and reselection parameters are configured for different terminals, if one or more terminal capability parameters of the terminal correspond to the above configuration index information, one set of cell selection and reselection parameters corresponding to the configuration index information is determined as one of the at least two sets of cell selection and reselection parameters to be sent to the terminal. Specifically, for example, when a terminal A has a terminal capability represented by the terminal capability parameter 1, a terminal B has a terminal capability represented by the terminal capability parameter 2, a terminal C has terminal capabilities represented by the terminal capability parameter 1 and the terminal capability parameter 2, and a terminal D neither has the terminal capability represented by the terminal capability parameter 1 nor has the terminal capability represented by the terminal capability parameter 2; according to the above step S111, the cell selection and reselection parameters which are applicable to configurations of the terminal A, the terminal B and the terminal C may be the cell selection and reselection parameters simultaneously corresponding to the terminal capability parameter 1 and the terminal capability parameter 2; and the terminal D applies to another set of cell selection and reselection parameters.

In a specific implementation process, the base station preconfigures corresponding cell selection and reselection parameters according to the current network configuration parameters previously regarding different terminal capability parameters. Therein, different terminal capability parameters represent different capabilities of the base station or capability degrees of the same capability of the base station.

Based on the above-mentioned solution, the configuration index information is bitmaps; and at least one or more bits in each bitmap are the configuration index corresponding to one terminal capability parameter.

Specifically, each bit in the bitmap expresses whether the terminal has or supports the terminal capability corresponding to the terminal capability parameter. Specifically, one bit can be used for expressing whether the terminal supports carrier aggregation; and if the number of frequency bands at which carrier aggregation is supported comprise N frequency bands, one bit can be allocated for each frequency band, and two states of the corresponding bit are used for expressing whether carrier aggregation is supported at this frequency band. In a specific implementation process, one configuration index in the bitmap can also be expressed using several bits. For example, if frequency bands at which carrier aggregation is supported are N frequency bands, $N=2^n$, then combinations of n bits can be used to indicate different frequency bands for carrier aggregation.

In a specific implementation process, the configuration index information can also be expressed by other means, such as one field or a mapping table comprising configuration indexes and terminal capability parameters, etc.

In this embodiment, the configuration index information is the one bitmap; and by adopting the bitmap to express the configuration index information, the amount of information is small and the method is simple and feasible.

Mode 2:

Step S110 may comprise:

one or more sets of cell selection and reselection parameters are preset according to different terminal capability parameters or a terminal capability parameter set, wherein the terminal capability parameter set comprises at least one terminal capability parameter;

a corresponding relation between the terminal capability parameters and the cell selection and reselection parameters is contained in a communication protocol; and at least two sets of cell selection and reselection parameters is determined according to the communication protocol.

Correspondingly, said sending the at least two sets of cell selection and reselection parameters comprises:

sending the preconfigured at least two sets of cell selection and reselection parameters according to the communication protocol.

When a plurality of sets of cell selection and reselection parameters are configured by adopting this mode, usually each terminal capability parameter set only corresponds to one set of cell selection and reselection parameters, but one set of cell selection and reselection parameters may correspond to a plurality of terminal capability parameter sets.

After the corresponding relation between terminal capability parameters and cell selection and reselection parameters is contained in the communication protocol, a static configuration is completed, and before the base station sends the cell selection and reselection parameters, only the communication protocol needs to be acquired for direct sending, implementation of which is simple, convenient and quick; and at the corresponding terminal side, the terminal can, according to the corresponding relation in the communication protocol, simply and conveniently select one set adaptable to the capability of the terminal itself after receiving the two or more sets of cell selection and reselection parameters.

Preferably, the method further comprises:

forming indication information, wherein the indication information is used for indicating the terminal capability parameters corresponding to each set of cell selection and reselection parameters; and sending the indication information.

The indication information can be synchronously formed together with each set of cell selection and reselection parameters, and may also be formed after or before each set of reselection parameters is formed.

In a specific execution process, when the cell selection and reselection parameters are configured and formed according to the configuration index information, forming the indication information may comprise acquiring the configuration index information corresponding to each set of cell selection and reselection parameters, wherein the indication information comprises the configuration index information or is the configuration index information. The specific structure of the indication information can be various, specifically, for example, bitmaps, etc.

The indication information may be synchronously sent together with each set of cell selection and reselection parameters, and may also be sent after or before the cell selection and reselection parameters are sent.

Specifically, the indication information can identify any information of a mapping relation between cell selection and reselection parameters and terminal capability parameters, and specifically may comprise two parts:

a first part can comprise an index of an $m^{th}$ set of cell selection and reselection parameters and an index of an $m^{th}$ terminal capability parameter corresponding to the corresponding $m^{th}$ set of cell selection and reselection parameters; and a second part can be a mapping relation between indexes representing cell selection and reselection parameters and indexes of terminal capability parameters. The indication information can be a mapping relation table.

In this embodiment, by sending the indication information, the terminal can determine one set of cell selection and reselection parameters suitable for terminal communication according to the indication information and the terminal capability parameter of the terminal.

Specifically, for example, when one set of cell selection and reselection parameters are expressed by a plurality of fields, at least one or all bits may be added in the fields which express this set of cell selection and reselection parameters to express the indication information; the added bits express the terminal capability parameter(s) corresponding to this set of cell selection and reselection parameters; and this expression way is simple and convenient, the amount of information is small and the terminal can simply and conveniently acquire the terminal capability parameter(s) corresponding to this set of cell selection and reselection parameters.

The specific structure of the terminal capability parameters indicated by the indication information and the communication parameters adaptable to the terminal capability parameters may be stored in the terminal and the base station by means of a communication protocol.

In addition, the base station can also sending default cell selection and reselection parameters, wherein, the default cell selection and reselection parameters are the cell selection and reselection parameters configured not according to the terminal capability parameters.

The default cell selection and reselection parameters are the cell reselection parameters which are configured by adopting an existing method, they can be sent together with the at least two sets of cell selection and reselection parameters in step S110 and can also be separately sent. The default cell selection and reselection parameters are not based on the terminal capability parameters in the configuration process. By sending the default cell selection and reselection parameters, it is convenient for selecting the default cell selection and reselection parameters for cell selection or reselection when the terminal capability parameters of the terminal do not correspond to the at least two sets of cell selection and reselection parameters in step S110.

Preferably, setting different cell selection and reselection parameters according to capabilities of the different terminal comprises:

setting the at least two sets of cell selection and reselection parameters according to at least one of the following terminal capability parameters; and the terminal capability parameters comprise:

whether the terminal supports carrier aggregation or not, frequency bands of the carrier aggregation supported by the terminal, capability grades of the terminal, whether the terminal supports dual connectivity or not, versions of communication protocols supported by the terminal, whether the terminal supports multi-input and multi-output or not, categories of multi-input and multi-output supported by the terminal, frequency bands of multi-input and multi-output supported by the terminal, whether the terminal supports coordinated multi-point (COMP) transmission or not, whether the terminal supports 3GPP/WLAN interoperation or not, whether the terminal is a special terminal defined in the communication protocol or not, whether the terminal has a special capability specified in the communication protocol and whether the terminal has a special capability defined in the communication protocol.

The special terminal defined in the communication protocol can be specifically a low-cost terminal defined in the communication protocol or a terminal which has special limitation to receiving bandwidth and/or processing capability, further such as a terminal which has clearly designated capability in 3GPP protocol.

The cell selection and reselection parameters are parameters defined in the communication protocol and for cell selection and/or reselection by the terminal, and comprise at least one of the following parameters:

a candidate frequency point list, a frequency point priority, a minimum receiving RSRP threshold, a minimum receiving RSRQ threshold, a higher priority selection threshold, a lower priority selection threshold, a speed state factor, a candidate cell list, a access barred cell list, cell access permission information, an offset aiming at a frequency point and an offset aiming at a cell. The lower priority selection threshold represents that the terminal can select a cell with a lower priority after this threshold is satisfied; and the higher priority selection threshold represents that the terminal can select a cell with a higher priority after this threshold is satisfied.

To sum up, relative to the prior art in which the base station only sends one type of cell selection and reselection parameters to the communication terminals which can receive the information of the base station, this embodiment provides a base station in the method for determining the cell selection and reselection parameter which configures and sends a plurality of sets of cell selection and reselection parameters according to the terminal capability parameter(s), so as to facilitate the terminal to select parameters which can better exert the communication capability thereof to perform communication, and thereby the advantages of improving the communication quality and the user satisfaction can be achieved.

Embodiment 2

Figure 3:
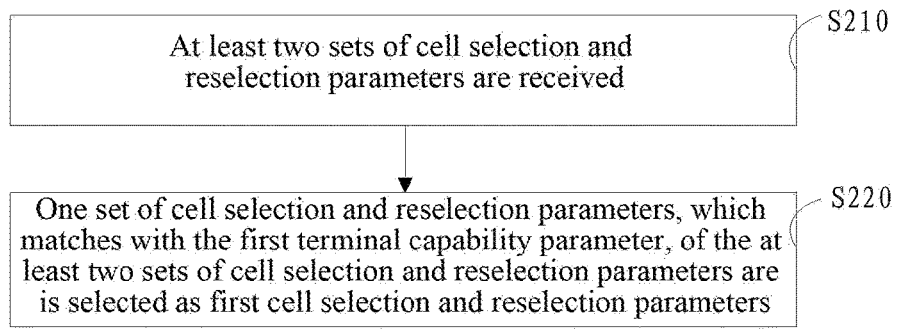
FIG. 3 illustrates a flowchart two of a method for determining cell selection and reselection parameters according to an embodiment of the present document.

As shown in FIG. 3, this embodiment provides a method for determining cell selection and reselection parameters, and the method comprises:

In step S210, at least two sets of cell selection and reselection parameters are received;

In step S220, one set of cell selection and reselection parameters, which matches with a first terminal capability parameter, of the at least two sets of cell selection and reselection parameters are selected as first cell selection and reselection parameters.

Therein, the first terminal capability parameter is a terminal capability parameter of a terminal; and the first cell selection and reselection parameters are used for cell selection and/or reselection of the terminal.

When executing step S210, the terminal receives the cell selection and reselection parameters from the base station; when executing step S220, the matching comprises mapping the terminal capability parameters corresponding to each set of cell selection and reselection parameters, and if a part of or all of terminal capability parameters in one set of cell selection and reselection parameters include the first terminal capability parameter, it can be considered as matching and this set of cell selection and reselection parameters can be used for the selection and/or reselection of the terminal. In a specific implementation process, for example, the terminal capability parameters corresponding to a set A of cell selection and reselection parameters comprise a terminal capability parameter 1 and a terminal capability parameter 2; when the first terminal capability parameter comprises the terminal capability parameter 1 or the terminal capability parameter 2, matching is realized; and at the same time, if the first terminal capability parameter comprises both the terminal capability parameter 1 and the terminal capability parameter 2, matching is also realized.

In this embodiment, the terminal receives the at least two sets of cell selection and reselection parameters from the base station, and the terminal selects one set of cell selection and reselection parameters suitable for itself according to a communication parameter representing communication capability thereof to perform cell reselection, in order to determine whether to reside in a current cell or to switch to another cell.

Preferably, step S210 comprises: receiving an RRC message; and acquiring the at least two sets of cell selection and reselection parameters from the RRC message.

In this embodiment, the at least two sets of cell selection and reselection parameters are carried in the RRC message, and thus the terminal firstly receives the RRC message and then acquires the cell selection and reselection parameters from corresponding fields of the RRC message. By adopting the above-mentioned method, the terminal receives the cell selection and reselection parameters while receiving the RRC message, the times that the terminal receives signals from the base station are fewer, and thus it is beneficial to prolong the standby duration of the terminal.

Specifically, the RRC message is an RRC reconfiguration message, an RRC release message, an RRC connection establishment reject message or a system message.

Preferably, step S210 can be receiving the at least two sets of cell selection and reselection parameters from a broadcast or multicast signal.

In addition, the method further comprises: receiving indication information, wherein the indication information is used for indicating the terminal capability parameter corresponding to each set of cell selection and reselection parameters; and step S220 correspondingly comprises:

determining a second terminal capability parameter corresponding to each set of cell selection and reselection parameters according to the indication information; and matching the second terminal capability parameters with the first terminal capability parameter.

Wherein, one set of cell selection and reselection parameters corresponding to second terminal capability parameter which is in the second terminal capability parameters and successfully matched with the first terminal capability parameter, is the first cell selection and reselection parameters.

The second terminal capability parameters and the first terminal capability parameter comprise at least one of:

whether the terminal supports carrier aggregation or not, frequency bands of the carrier aggregation supported by the terminal, capability grades of the terminal, whether the terminal supports dual connectivity or not, versions of communication protocols supported by the terminal, whether the terminal supports multi-input and multi-output or not, categories of multi-input and multi-output supported by the terminal, frequency bands of multi-input and multi-output supported by the terminal, whether the terminal supports coordinated multi-point (COMP) transmission or not, whether the terminal supports 3GPP/WLAN interoperation or not, whether the terminal is a special terminal defined in the communication protocol or not, and whether the terminal has a special capability defined in the communication protocol.

Each set of cell selection and reselection parameters can comprise several cell selection and reselection parameters, and can specifically comprise at least one of:

a candidate frequency point list, a frequency point priority, a minimum receiving RSRP threshold, a minimum receiving RSRQ threshold, a higher priority selection threshold, a lower priority selection threshold, a speed state factor, a candidate cell list, a access barred cell list, cell access permission information, an offset aiming at a frequency point and an offset aiming at a cell.

The basis of forming each set of cell selection and reselection parameters may not only comprise the terminal capability parameters, but also may comprise network configuration parameters of each cell in a current communication state.

Embodiment 3

Figure 4:
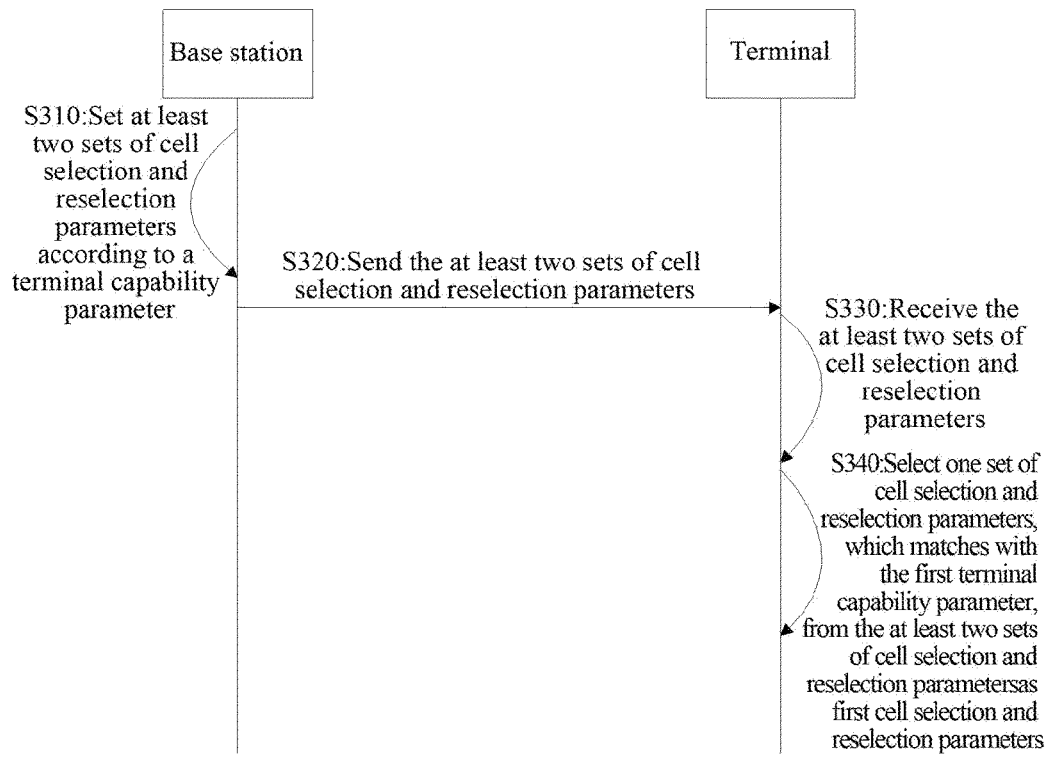
FIG. 4 illustrates a flowchart three of a method for determining cell selection and reselection parameters according to an embodiment of the present document.

As shown in FIG. 4, this embodiment provides a method for determining cell selection and reselection parameters, and the method comprises:

in step S310, a base station sets at least two sets of cell selection and reselection parameters according to a terminal capability parameter;

in step S320, the base station sends the at least two sets of cell selection and reselection parameters;

in step S330, a terminal receives the at least two sets of cell selection and reselection parameters;

in step S340, the terminal selects one set of cell selection and reselection parameters, which matches with a first terminal capability parameter, of the at least two sets of cell selection and reselection parameters as first cell selection and reselection parameters.

Therein, the first terminal capability parameter is a terminal capability parameter of the terminal; and the first cell selection and reselection parameters are used for cell selection and/or reselection of the terminal.

For The operations executed by the base station in this embodiment, can refer to the technical solution of any one of the methods for determining cell selection and reselection parameters determination methods in the embodiment 1; for the operations executed by the terminal, can refer to the technical solution of any one of the methods for determining cell selection and reselection parameters determination methods in the embodiment 2. Similarly, this embodiment can make the terminal convenient for exerting the communication capability, which can effectively improve the communication quality and user satisfaction.

The method further comprises:

the base station further forms indication information, wherein the indication information is used for indicating the terminal capability parameter(s) corresponding to each set of cell selection and reselection parameters;

the base station further sends the indication information;

the terminal further receives the indication information; and the terminal selects the one set of cell selection and reselection parameters, which matches with the first terminal capability parameter, of the at least two sets of cell selection and reselection parameters as the first cell selection and reselection parameters comprises:

the terminal determining a second terminal capability parameter corresponding to each set of cell selection and reselection parameters according to the indication information; and the terminal matching second terminal capability parameters with the first terminal capability parameter, wherein, one set of cell selection and reselection parameters corresponding to the second terminal capability parameter which is in the second terminal capability parameters and successfully matches with the first terminal capability parameter, is the first cell selection and reselection parameters.

By forming the indication information, it is convenient for the terminal side selecting and determining the first cell selection and reselection parameters according to the indication information, thus, there is an advantage of improving the communication quality can while there is another advantage of simplicity and convenience in implementation. The indication information may be or may comprise the configuration index information used when the base station configures each set of cell selection and reselection parameters, and the specific structure can be bitmaps.

In a specific implementation process, the base station further comprises forming default cell selection and reselection parameters; the default cell selection and reselection parameters are cell selection and reselection parameters which are configured not according to the terminal capability parameter; and when there is no cell selection and reselection parameters which matches with the first terminal capability parameter in the at least two sets of cell selection and reselection parameters, the default cell selection and reselection parameters are selected as the cell selection and reselection parameters of the terminal.

To sum up, according to the method for determining cell selection and reselection parameters provided by this embodiment, the base station side sends the at least two sets of cell selection and reselection parameters instead of only one set of cell selection and reselection parameters which is sent in the traditional sending method, the terminal side receives a plurality of sets of cell selection and reselection parameters and selects according to the terminal capability of the terminal one set which can better exert the terminal capability of the terminal to trigger or perform cell reselection, and thus the communication effect and the user satisfaction can be improved.

Embodiment 4

Figure 5:
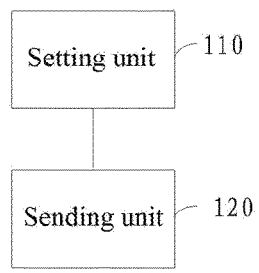
FIG. 5 illustrates a structural schematic diagram of a base station according to an embodiment of the present document.

As shown in FIG. 5, this embodiment provides a base station, and the base station comprises:

a setting unit 110, configured to set at least two sets of cell selection and reselection parameters according to a terminal capability parameter; and a sending unit 120, configured to send the at least two sets of cell selection and reselection parameters;

wherein one set of cell selection and reselection parameters, which matches with the terminal capability parameter of a terminal, of the at least two sets of cell selection and reselection parameters is used for cell selection and/or reselection of the terminal.

A specific structure of the setting unit 110 may be a processor; the processor may be a processor such as a central processing unit, a microprocessor, a single-chip microcomputer, a digital signal processor and a programmable array, etc., which have processing function; and the processor configures a plurality of sets of cell selection and reselection parameters according to terminal capability parameters by running executable instructions.

A specific structure of the sending unit 120 may be transmitting antennas, a transmitting antenna matrix, or the like; and the transmitting antennas receive the cell selection and reselection parameters from the setting unit and then sends to the terminal.

Preferably, the sending unit 120 is specifically configured to bear the at least two sets of cell selection and reselection parameters in an RRC message for sending. Therein, the RRC message is an RRC reconfiguration message, an RRC release message or an RRC connection establishment reject message.

The sending unit 120 is specifically configured to send the cell selection and reselection parameters through a broadcast or multicast signal.

Preferably, the setting unit 110 may have various structures and preferably comprise the following two types:

Type 1: the setting unit 110 can comprise:

a first configuration module, configured to preset at least one piece of configuration index information, wherein each piece of configuration index information comprises at least one configuration index, and one configuration index corresponds to one terminal capability parameter;

a second configuration module, configured to preconfigure one set of cell selection and reselection parameters according to each piece of configuration index information; and a determination module, configured to, when the terminal capability parameter corresponds to at least one or all configuration indexes in one piece of configuration index information, determine the one set of cell selection and reselection parameters corresponding to the configuration index information as one of the at least two sets of cell selection and reselection parameters.

The first configuration module, the second configuration module and the determination module may correspond to different processors respectively or correspond to the same processor; and when the three modules correspond to the same processor, the processor can adopt time-sharing processing or different threads to implement the functions of various modules.

The configuration index information is bitmaps; and at least one or all bits in each bitmap are the configuration index corresponding to one terminal capability parameter.

Type 2: the setting unit 110 can comprise:

a third configuration module, configured to preset one or more sets of cell selection and reselection parameters according to different terminal capability parameters or a terminal capability parameter set, wherein the terminal capability parameter set comprises at least one terminal capability parameter;

a storage module, configured to store a corresponding relation between the terminal capability parameters and the cell selection and reselection parameters in a communication protocol; and a second determination module, configured to determine the at least two sets of cell selection and reselection parameters according to the communication protocol;

when the type 2 of the structure of the setting unit 110 is adopted, the sending unit 120 is specifically configured to send the preconfigured at least two sets of cell selection and reselection parameters according to the communication protocol.

The base station further comprises:

a forming unit, configured to form indication information, wherein the indication information is used for indicating the terminal capability parameter corresponding to each set of cell selection and reselection parameters; and the sending unit 120 is further configured to send the indication information.

A specific structure of the forming unit can be a processor; the processor can be a processor such as a central processing unit, a microprocessor, a single-chip microcomputer, a digital signal processor and a programmable array, etc., which have a processing function; and the processor forms the indication information of each set of cell selection and reselection parameters by running executable instructions.

In addition, the sending unit 120 sends default cell selection and reselection parameters, wherein, the default cell selection and reselection parameters are cell selection and reselection parameters configured not according to the terminal capability parameter.

Preferably, the setting unit 110 is configured to set at least two sets of cell selection and reselection parameters according to at least one of the following terminal capability parameters; and the terminal capability parameters comprise:

whether the terminal supports a carrier aggregation or not, frequency bands of carrier aggregation supported by the terminal, capability grades of the terminal, whether the terminal supports a dual connectivity or not, a version of a communication protocol supported by the terminal, whether the terminal supports multi-input and multi-output or not, frequency bands of multi-input and multi-output supported by the terminal, whether the terminal supports COMP or not, whether the terminal supports a 3GPP/WLAN interoperation or not, whether the terminal is a special terminal defined in the communication protocol or not and whether the terminal has a special capability defined in the communication protocol.

According to the above terminal capability parameters, the cell selection and reselection parameters are parameters defined in the communication protocol and for the cell selection and/or reselection by the terminal, and comprise at least one of:

a candidate frequency point list, a frequency point priority, a minimum receiving RSRP threshold, a minimum receiving RSRQ threshold, a higher priority selection threshold, a lower priority selection threshold, a speed state factor, a candidate cell list, a access barred cell list, cell access permission information, an offset aiming at a frequency point and an offset aiming at a cell, and other cell selection and reselection parameters defined in the communication protocol.

In a specific implementation process, the base station can not send the indication information but send different sets of cell selection and reselection parameters through different time domain resources, so as to be convenient for the terminal determining according to different time domain resources that the cell selection and reselection parameters born by the time domain resources are configured according to which terminal capability parameters or terminal capability parameter set. Specifically, for example, the sending unit 120 is configured to determine the time domain resource for sending each set of cell selection and reselection parameters according to a pre-appointed mapping relation between terminal capability parameters and time domain resources; and send each set of cell selection and reselection parameters on the corresponding time domain resource.

Therein, the time domain resources corresponding to different sets of cell selection and reselection parameters are different.

The base station provided by this embodiment provides a specific hardware support for the method for determining cell selection and reselection parameters in embodiment 1, can be used for implementing any technical solution in embodiment 1 and can effectively improve the communication quality and user satisfaction.

Embodiment 5

Figure 6:
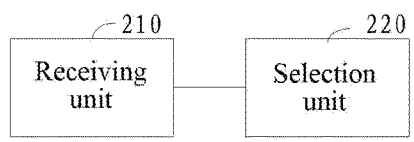
FIG. 6 illustrates a structural schematic diagram of a terminal according to an embodiment of the present document.

As shown in FIG. 6, this embodiment provides a terminal, and the terminal comprises:

a receiving unit 210, configured to receive at least two sets of cell selection and reselection parameters; and a selection unit 220, configured to select one set of cell selection and reselection parameters, which matches with a first terminal capability parameter, from the at least two sets of cell selection and reselection parameters as first cell selection and reselection parameters, wherein, the first terminal capability parameter is a terminal capability parameter of the terminal; and the first cell selection and reselection parameters are used for cell selection and/or reselection of the terminal.

A specific structure of the receiving unit 210 can be a receiving interface, e.g., a communication interface such as a receiving antenna having a receiving unit. A specific structure of the selection unit 220 can be a processor; the processor can be a processor such as a central processing unit, a microprocessor, a single-chip microcomputer, a digital signal processor and a programmable array, etc., which have a processing function; and the processor selects the first cell selection and reselection parameters matching with the terminal capability parameter of the terminal by running executable instructions.

As compared with the prior art in which only one set of cell selection and reselection parameters are acquired from one base station, the terminal in this embodiment acquires a plurality of sets of cell selection and reselection parameters from a cell selection and reselection parameter sender such as the base station, to trigger or perform a cell reselection process.

The receiving unit 210 may comprise:

a receiving module, configured to receive an RRC message; and an acquisition module, configured to acquire the at least two sets of cell selection and reselection parameters from the RRC message.

Therein, the RRC message is preferably an RRC reconfiguration message, an RRC release message, an RRC connection establishment reject message or a system message.

The receiving unit 210 is configured to receive the at least two sets of cell selection and reselection parameters from a broadcast or multicast signal.

The receiving unit 210 is further configured to receive indication information, wherein the indication information is used for indicating the terminal capability parameter corresponding to each set of cell selection and reselection parameters; and the selection unit 220 comprises:

a determination module, configured to determine a second terminal capability parameter corresponding to each set of cell selection and reselection parameters according to the indication information; and a matching module, configured to match second terminal capability parameters with the first terminal capability parameter, wherein, one set of cell selection and reselection parameters corresponding to the second terminal capability parameter which is in the second terminal capability parameters and successfully matches with the first terminal capability parameter, is the first cell selection and reselection parameters.

Specific structures of the determination module and the matching module may be respectively processors or different logic divisions of the same processor.

In a specific implementation process, the receiving unit 210 is further configured to receive default cell selection and reselection parameters; and the selection unit 220 is further configured to, when there is no cell selection and reselection parameters matching with the first terminal capability parameter in the at least two sets of cell selection and reselection parameters, select the default cell selection and reselection parameters as the cell selection and reselection parameters of the terminal.

The second terminal capability parameters and the first terminal capability parameter comprise at least one of:

whether the terminal supports a carrier aggregation or not, frequency bands of carrier aggregation supported by the terminal, capability grades of the terminal, whether the terminal supports a dual connectivity or not, a version of a communication protocol supported by the terminal, whether the terminal supports multi-input and multi-output or not, categories of multi-input and multi-output supported by the terminal, frequency bands of multi-input and multi-output supported by the terminal, whether the terminal supports coordinated multi-point (COMP) transmission or not, whether the terminal supports a 3GPP/WLAN interoperation or not, whether the terminal is a special terminal defined in the communication protocol or not and whether the terminal has a special capability defined in the communication protocol.

Each set of cell selection and reselection parameters comprises at least one of:

a candidate frequency point list, a frequency point priority, a minimum receiving RSRP threshold, a minimum receiving RSRQ threshold, a higher priority selection threshold, a lower priority selection threshold, a speed state factor, a candidate cell list, a access barred cell list, cell access permission information, an offset aiming at a frequency point and an offset aiming at a cell, and other cell selection and reselection parameters defined in the communication protocol.

The terminal provided by this embodiment provides a specific hardware support for the method for determining cell selection and reselection parameters in embodiment 2, can be used for implementing any technical solution in embodiment 2 and can effectively improve the communication quality and user satisfaction.

Embodiment 6

Figure 7:
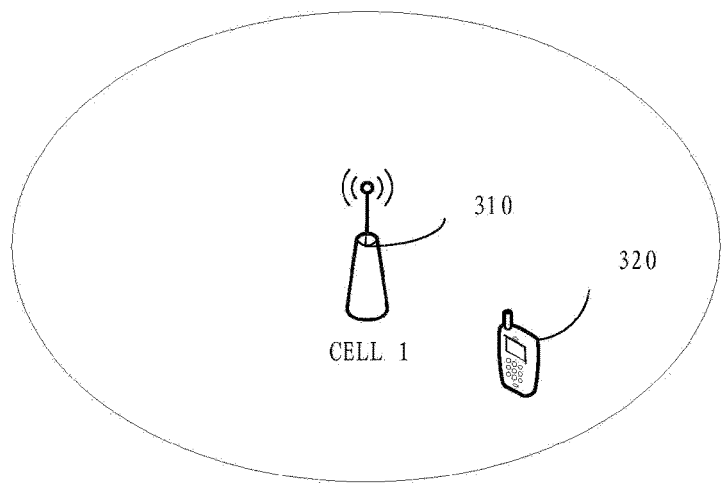
FIG. 7 illustrates a structural schematic diagram of a communication system according to an embodiment of the present document.

As shown in FIG. 7, this embodiment provides a communication system, and the system comprises:

a base station 310, configured to set at least two sets of cell selection and reselection parameters according to a terminal capability parameter, and send the at least two sets of cell selection and reselection parameters;

a terminal 320, configured to receive the at least two sets of cell selection and reselection parameters, and select one set of cell selection and reselection parameters, which matches with a first terminal capability parameter, from the at least two sets of cell selection and reselection parameters as first cell selection and reselection parameters;

wherein the first terminal capability parameter is a terminal capability parameter of the terminal; and the first cell selection and reselection parameters are used for cell selection and/or reselection of the terminal.

Therein, the base station 310 covers and forms a CELL 1. In this embodiment, the base station sets a plurality of sets of cell selection and reselection parameters according to terminal capability parameters. In a specific implementation process, the base station further considers configuration parameters of a current network when setting the plurality of sets of cell selection and reselection parameters, specifically, parameters such as sending power consumption, load and time domain resources, etc., of a cell covered by the base station, and simultaneously considers parameters such as time domain resources of a neighboring cell of this cell, so as to finally determine the plurality of sets of cell selection and reselection parameters. The terminal receives the plurality of different sets of cell selection and reselection parameters from the same base station, and then selects cell selection and reselection parameters which can fully exert the communication capability of the terminal according to the terminal capability parameter of the terminal, to trigger and/or perform the cell reselection. After the terminal 320 triggers and performs the cell reselection according to the cell selection and reselection parameters, the terminal 320 can determine whether to continuously reside in the CELL 1 or not.

The base station 310 is further configured to form and send indication information; and the terminal 320 is further configured to receive the indication information; determine a second terminal capability parameter corresponding to each set of cell selection and reselection parameters according to the indication information; and match second terminal capability parameters with the first terminal capability parameter;

wherein, one set of cell selection and reselection parameters corresponding to the second terminal capability parameter which is in the second terminal capability parameters and successfully matches with the first terminal capability parameter, is the first cell selection and reselection parameters.

By forming and sending the indication information through the base station 310, it is convenient for the terminal 320 selecting according to the terminal capability parameter of the terminal, and the execution complexity of the terminal selecting the most suitable first cell selection and reselection parameters is simplified.

In a specific implementation process, the base station may send the cell selection and reselection parameters through an RRC message, and the corresponding terminal may receive the cell selection and reselection parameters from the RRC message. The base station may send the cell selection and reselection parameters by means of a broadcast, multicast or unicast signal, and the terminal receives the corresponding broadcast, multicast or unicast signal to acquire the cell selection and reselection parameters.

The base station 310 and the terminal 320 are connected through a wireless network, specifically, for example, a communication network of the second generation, the third generation, the fourth generation or the fifth generation, or a higher generation.

The terminal provided by this embodiment provides a specific hardware support for the method for determining cell selection and reselection parameters in embodiment 3, can be used for implementing any technical solution in embodiment 3 and can effectively improve the communication quality and user satisfaction.

Several specific application examples are provided below in combination with any above-mentioned embodiments.

Example 1

Figure 8:
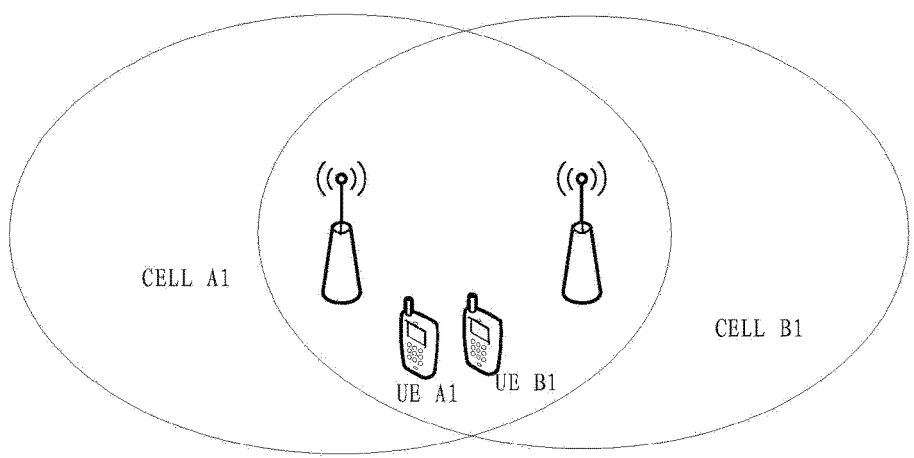
FIG. 8 illustrates a structural schematic diagram one of a communication system according to an example of the present document.

A communication system, as shown in FIG. 8, comprises a first base station, a second base station, a terminal UE A1 and a terminal UE B1; wherein the first base station covers and forms a CELL A1, the second base station covers and forms a CELL B1, and the CELL A1 and the CELL B1 are partially overlapped in coverage. At current, the terminal UE A1 and the terminal UE B1 are located in the overlapped coverage area. Both the first base station and the second base station may be eNBs.

The CELL A1 uses a frequency point A and supports a function 1; the CELL B1 uses a frequency point B and does not support the function 1; the UE A1 supports the function 1; and the UE B1 does not support the function 1.

Both the UE A1 and the UE B1 are in an IDLE state, are located at close or the same geographic location, and reside in the CELL A1 at current.

The eNB determines cell selection and reselection parameters and broadcasts in a system message (the cell selection and reselection parameters may also be sent to UE through an RRC reconfiguration, RRC release or RRC reject message, etc.).

Therein, the system message carries cell selection and reselection parameters customized for the function 1 (i.e., terminal-dedicated frequency priority applicable to function 1), in addition to common cell selection and reselection parameters. In the common cell selection and reselection parameters, the priority of the frequency point at which the CELL A1 is located is lower than the priority of the frequency point at which the CELL B1 is located. The eNB instructs that the priority of the frequency point at which the CELL A1 is located is higher than the priority of the frequency point at which the CELL B1 is located through "UE-dedicated frequency priority applicable to function 1" of each frequency point, in order to enable the terminal supporting the function 1 to be able to reside at the CELL A1 to obtain better services.

After the terminal receives the system message from the CELL A1, the terminal judges whether the terminal has special cell selection and reselection parameters corresponding to the function of the terminal itself or not, if yes, the terminal uses the special cell selection and reselection parameters corresponding to the function of the terminal, otherwise, the terminal uses the common cell selection and reselection parameters.

Since the UE A1 supports the function 1, the UE A1 adopts "UE-dedicated frequency priority applicable to function 1" (since other cell selection and reselection parameters are not configured with special values for function 1, the common cell selection and reselection parameters not related to UE capability are still used), considers that the frequency point at which the CELL A1 is located has a higher priority, and continuously resides in the CELL A1; and since the UE B1 does not support the function 1, the UE B1 uses the common cell selection and reselection parameters, considers that the CELL B1 has a higher priority, then the UE B1 performs the cell reselection and resides in the CELL B1.

The function-dedicated cell selection and reselection parameters can be respectively configured to be at least one or all following parameters aiming at at least one or all carrier frequencies and/or at least one or all cells and aiming at different UE capabilities:

frequency point priority (absolute priority), a minimum receiving RSRP threshold (Q-RxLevMin), a minimum receiving RSRQ threshold (Q-QualMin), a higher priority selection threshold (threshX-High), a lower priority selection threshold (threshX-Low), a speed state factor (SpeedStateScaleFactors), an access-barred cell list (BlackCellList), an offset aiming at frequency point (q-OffsetFreq) and an offset aiming at cell (q-OffsetCell). Wherein, for parameters which do not exist in the function-dedicated cell selection and reselection parameters, the terminal still use the values of the corresponding parameters in the common cell selection and reselection parameters.

The function 1 may be one or a combination of a plurality of following functions:

a situation that the terminal supports CA (whether the terminal supports CA or not and/or frequency bands at which the terminal supports CA), a capability grade of the terminal (ue-category defined in protocol 36.306, in this embodiment, the function may be defined as that the terminal supports a certain category or the terminal supports a capability grade higher than a certain category, and may also be respectively defined according to uplink and downlink), whether the terminal supports SMALL CELL dual connectivity, a protocol version supported by the terminal (e.g., R9, R10, R11 or R12, etc.), a situation that the terminal supports MIMO (whether the terminal supports MIMO and/or the terminal supports which types of MIMO), a situation that the terminals supports COMP, whether the terminal supports 3GPP/WLAN interoperation or not, whether the terminal is a special terminal defined in a certain protocol (e.g., as defined in the protocol, Low Cost MTC UE have a series of capability limitations such as receiving bandwidth limitation, etc.), and at least one or all other terminal capability parameters representing terminal capabilities and have defined capabilities in 3GPP protocol 36.306.

Example 2

Figure 9:
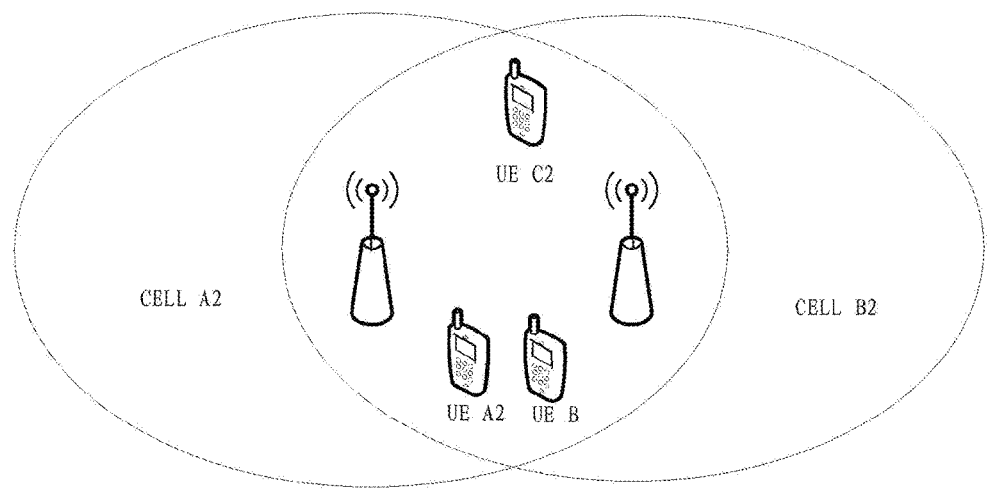
FIG. 9 illustrates a structural schematic diagram two of a communication system according to an example of the present document.

A communication system, as shown in FIG. 9, comprises a third base station, a fourth base station, a terminal UE A2, a terminal UE B2 and a terminal UE C2, wherein the third base station covers and forms a CELL A2; the fourth base station covers and forms a CELL B2; and the CELL A2 and the CELL B2 are partially overlapped in coverage. The terminal UE A2, the terminal UE B2 and the terminal UE C2 are located in the overlapped coverage area. Both the third base station and the fourth base station may be eNBs.

Network configuration parameters of each cell are as follows: the CELL A2 uses a frequency point A and supports a function 1 and a function 2, and the CELL B2 uses a frequency point B and does not support the function 1 and the function 2.

Terminal capability parameters of each terminal are as follows: the UE A2 supports the function 1 and the function 2, the UE B2 does not support the function 1 and the function 2, and the UE C2 supports the function 1 but does not support the function 2.

The terminal UE A2, the terminal UE B2 and the terminal UEC2 are in an IDLE state, and are located in the overlapped coverage area of the two cells. In addition, it is supposed that the intensity of various signals acquired by the three terminals from the two base stations at current is equal and the three terminals reside in a cell A at current.

The base station which forms the CELL A2 customizes independent cell selection and reselection parameters for the terminals which support the function 1 and/or the function 2, and broadcasts the independent cell selection and reselection parameters in a system message.

Therein, the system message carries two sects of cell selection and reselection parameters, wherein one set is cell selection and reselection parameters A, and the other set is cell selection and reselection parameters B.

Therein, the cell selection and reselection parameters B contain an 8-bit bitmap, and as appointed in the protocol, a first bit (bit 0) of the bitmap represents whether the function 1 is supported or not, a second bit (bit 1) represents whether the function 2 is supported or not, and the other bits are reserved bits. In the example, bit 0 and bit 1 are set to be 1, representing that the set of cell selection and reselection parameters is applicable to terminals which support the function 1 and/or the function 2 (i.e., supporting any one of the functions).

In order to enable the terminals which support the function 1 and/or function 2 to be able to reside in the CELL A2 to obtain better services, the eNB configures in the cell selection and reselection parameters A that the priority of the frequency point at which the CELL A2 is located is lower than the priority of the frequency point at which the CELL B2 is located; and in the cell selection and reselection parameters B, the priority of the frequency point at which the CELL A2 is located is higher than the priority of the frequency point at which the CELL B2 is located.

After the terminal receives the system message in the CELL A2, the terminal judges whether the terminal has the capability indicated in the terminal capability bitmap in the system message or not. If the terminal has any one of capabilities indicated as 1 in the bitmap (function 1 and function 2 in this embodiment), the terminal uses the cell selection and reselection parameters corresponding to the bitmap, otherwise, the terminal uses the set of cell selection and reselection parameters which does not contain the bitmap.

Since the UE A2 supports the function 1 and the function 2, the UE A2 adopts the cell selection and reselection parameters B, considers that the frequency point at which the CELL A2 is located has a higher priority, and continuously resides in the CELL A2.

Since the UE B2 does not support the function 1 and the function 2, the UE B2 uses the cell selection and reselection parameters A, considers that the CELL B2 has a higher priority, then performs the cell reselection and resides in the CELL B2.

Since the UE C2 supports the function 1, (although the UE C2 does not support the function 2, but the function 1 can match with the function in the bitmap,) the UE C2 adopts the cell selection and reselection parameters B, considers that the frequency point at which the CELL A2 is located has a higher priority, and continuously resides in the CELL A2.

The bitmap in this example may be considered as the indication information in embodiment 1 to embodiment 6.

In the cell selection and reselection parameters B, except for the frequency priority, the following parameters may be respectively configured for at least one or all carrier frequencies and/or at least one or all cells and aiming at different UE capabilities:

a minimum receiving RSRP threshold (Q-RxLevMin), a minimum receiving RSRQ threshold (Q-QualMin), a higher priority selection threshold (threshX-High), a lower priority selection threshold (threshX-Low), a speed state factor (SpeedStateScaleFactors), an access-barred cell (BlackCell-List), an offset aiming at frequency point (q-OffsetFreq) and an offset aiming at cell (q-OffsetCell).

Example 3

Figure 10:
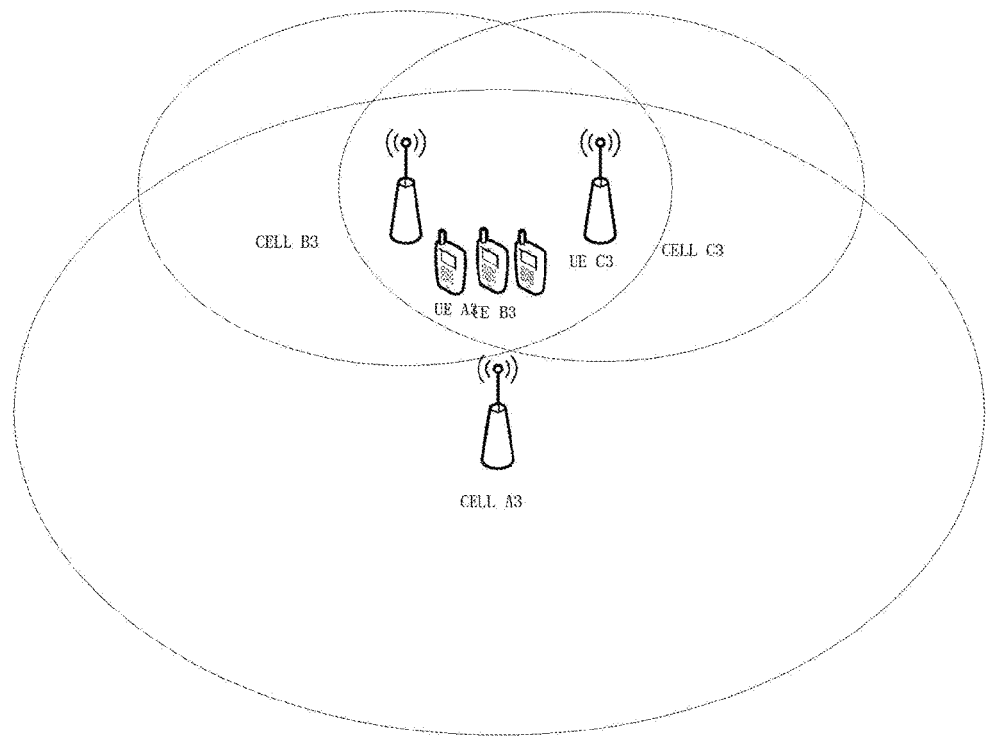
FIG. 10 illustrates a structural schematic diagram three of a communication system according to an example of the present document.

A communication system, as illustrated shown in FIG. 10, comprises a fifth base station, a sixth base station, a seventh base station, a terminal UE A3, a terminal UE B3 and a terminal UE C3, wherein the fifth base station covers and forms a CELL A3; the sixth base station covers and forms a CELL B3, the seventh base station covers and forms a CELL C3; and the CELL A2, the CELL B2 and the CELL C3 are partially overlapped in coverage. The terminal UE A3, the terminal UE B3 and the terminal UE C3 are located in the overlapped coverage area. The base stations may be eNBs.

Network configuration parameters of the cells are as follows:

the CELL A3 uses a frequency point A and supports a function 1 and a function 2;

the CELL B3 uses a frequency point B and support the function 1 but does not support the function 2; and the CELL C3 uses the frequency point B and does not support the function 1 and the function 2.

Capabilities of all terminals are as follows:

the UE A3 supports the function 1 and the function 2;

the UE C3 does not support the function 1 and the function 2; and the UE B3 supports the function 1 but does not support the function 2.

The three terminals are in an IDLE state. It is supposed that the three terminals are located at the same geographic location and reside in the CELL A3 at current. Results of measurement performed by UE to CELL A/B/C are the same.

The eNB customizes independent cell selection and reselection parameters for the terminals which support the function 1 and/or the function 2 in the CELL A3, and broadcasts the cell selection and reselection parameters in a system message.

Therein, the system message carries three sects of cell selection and reselection parameters, i.e., respectively cell selection and reselection parameters 1, cell selection and reselection parameters 2 and cell selection and reselection parameters 3; and the cell selection and reselection parameters 2 and the cell selection and reselection parameters 3 respectively contain a corresponding 8-bit bitmap, and as appointed in the protocol, a first bit (bit 0) of the bitmap expresses whether the function 1 is supported or not, a second bit (bit 1) expresses whether the function 2 is supported or not, and other bits are reserved bits.

In the example, the bit 0 and bit 1 in the cell selection and reselection parameters 2 are set to be 1 (expressing that this set of parameters are applicable to the UE which simultaneously supports the function 1 and the function 2, and the bit 0 in the cell selection and reselection parameters 3 is set to be 1 and the bit 1 is set to be 0 (expressing that this set of parameters are applicable to the UE which supports the function 1 but does not support the function 2).

In the cell selection and reselection parameters 1, the eNB configures that the priority of the frequency point at which the CELL A3 is located is lower than the priorities of the frequency points at which the CELL B3 and the CELL C3 are located respectively, configures a dedicated offset (q-OffsetCell) of 18 db for the CELL C3 and configures a dedicated offset (q-OffsetCell) of −2 db for the CELL B3.

In the cell selection and reselection parameters 2, the priority of the frequency point at which the CELL A3 is located is higher than the priorities of the frequency points at which the CELL B3 and the CELL C3 are located respectively.

In the cell selection and reselection parameters 3, the eNB configures that the priority of the frequency point at which the CELL A3 is located is lower than the priorities of the frequency points at which the CELL B3 and the CELL C3 are located respectively, configures a dedicated offset (q-OffsetCell) of 18 db for the CELL B3 and does not configures a dedicated offset (q-OffsetCell) for the CELL C3.

After the terminal receives the system message in the CELL A3, the terminal judges whether the terminal has the capability indicated in the capability bitmap in the system message or not. If the terminal has all capabilities indicated as 1 in the bitmap, the UE uses the cell selection and reselection parameters corresponding to the bitmap; and if the terminal finds that no fully matching bitmap exists after checking all bitmaps, the terminal uses the set of cell selection and reselection parameters which do not contain the bitmap.

Since the terminal UE A3 supports the function 1 and the function 2, the UE A3 adopts the cell selection and reselection parameters 2, considers that the frequency point at which the CELL A3 is located has a higher priority, and continuously resides in the CELL A3.

Since the UE B3 only supports the function 1 but does not support the function 2, the UE B3 uses the cell selection and reselection parameters 3, considers that the frequency points at which the CELL B3 and the CELL C3 are located have a higher priority, and compares the measurement results of the CELL B3 and the CELL C3 to select the cell to reside, wherein q-OffsetCell is considered during comparison. Since the measurement results performed by the UE B3 to the CELL B3 and the CELL C3 are the same, it can be seen that the measurement result +18 db of the CELL B3 is greater than the measurement result of the CELL C3 (since no q-OffsetCell for cellC is configured, q-OffsetCell is not added), and the terminal UE B3 selects the CELL B3 to reside.

Since the UE C3 does not support the function 1 and the function 2, the UE C3 selects the cell selection and reselection parameters 1 without the bitmap, considers that the frequency points at which the CELL B3 and the CELL C3 are located have a higher priority, compares the measurement results of the CELL B3 and the CELL C3 to select the cell to reside, wherein q-OffsetCell is considered during comparison. Since the measurement results performed by the UE C3 to the CELL B3 and the CELL C3 are the same, it can be seen that the measurement result −2 db of the CELL B3 is smaller than the measurement result+18 db of the CELL C3, and thus the UE C3 selects the CELL C3 to reside.

In the cell selection and reselection parameters 2 and 3, in addition to priorities of frequency points and cell offsets, at least one or all following parameters can be respectively configured aiming at at least one or all carrier frequencies and/or at least one or all cells and aiming at different UE capabilities:

a minimum receiving RSRP threshold (Q-RxLevMin), a minimum receiving RSRQ threshold (Q-QualMin), a higher priority selection threshold (threshX-High), a lower priority selection threshold (threshX-Low), a speed state factor (SpeedStateScaleFactors), an access-barred cell (BlackCellList) and an offset aiming at frequency point (q-OffsetFreq).

Therein, for parameters which do not exist in the cell selection and reselection parameters 2 and 3, the terminal may select to use the values of the corresponding parameters in the cell selection and reselection parameters 1.

The embodiment of the present document further provides a computer storage medium, wherein the computer storage medium stores computer-executable instructions, and the computer executable instructions are used for executing at least one of the methods provided by embodiment 1 to embodiment 3, specifically, the method shown in FIG. 1, FIG. 3 or FIG. 4.

The computer storage medium comprises various mediums which can store program codes, such as mobile storage devices, Read-Only Memories (ROM), Random Access Memories (RAM), magnetic discs or compact discs, etc.; preferably is a non-transient storage medium.

The embodiments described above are just preferred embodiments of the present document and are not used for limiting the protection scope of the present document. Any modification made according to the principle of the present document shall be understood as included in the protection scope of the present document.

What is claimed is:

1. A method for determining cell selection and reselection parameters, comprising:
  setting at least two sets of cell selection and reselection parameters according to a terminal capability parameter; and
  sending the at least two sets of cell selection and reselection parameters,
  wherein, one set of cell selection and reselection parameters, which matches with the terminal capability parameter of a terminal, of the at least two sets of cell selection and reselection parameters is used for cell selection and/or reselection of the terminal,
  wherein setting at least two sets of cell selection and reselection parameters according to a terminal capability parameter comprises:
  presetting at least one piece of configuration index information, wherein each piece of configuration index information comprises at least one configuration index, and one configuration index corresponds to one terminal capability parameter;

preconfiguring one set of cell selection and reselection parameters according to each piece of configuration index information; and when the terminal capability parameter corresponds to at least one configuration index in one piece of configuration index information, determining the one set of cell selection and reselection parameters corresponding to the configuration index information as one of the at least two sets of cell selection and reselection parameters;

or when terminal capability parameters correspond to all configuration indexes in one piece of configuration index information, determining one set of cell selection and reselection parameters corresponding to the configuration index information as one of the at least two sets of cell selection and reselection parameters.

2. The method according to claim 1, wherein, sending the at least two sets of cell selection and reselection parameters comprises:

bearing the at least two sets of cell selection and reselection parameters in an RRC message for sending;

wherein, the RRC message is an RRC reconfiguration message, an RRC release message, an RRC connection establishment reject message or a system message.

3. The method according to claim 1, wherein, the configuration index information is bitmaps; and one or more bits in each bitmap is the configuration index corresponding to one terminal capability parameter.

4. The method according to claim 1, wherein, setting at least two sets of cell selection and reselection parameters according to a terminal capability parameters comprises:

presetting one or more sets of cell selection and reselection parameters according to different terminal capability parameters or a terminal capability parameter set, wherein the terminal capability parameter set comprises at least one terminal capability parameter;

containing a corresponding relation between the terminal capability parameters and the cell selection and reselection parameters in a communication protocol; and determining the at least two sets of cell selection and reselection parameters according to the communication protocol;

correspondingly, sending the at least two sets of cell selection and reselection parameters comprises:

sending the preconfigured at least two sets of cell selection and reselection parameters according to the communication protocol.

5. The method according to claim 1, wherein the method further comprises:

forming indication information, wherein the indication information is used for indicating the terminal capability parameter corresponding to each set of cell selection and reselection parameters; and sending the indication information.

6. The method according to claim 1, wherein the method further comprises:

sending default cell selection and reselection parameters, wherein, the default cell selection and reselection parameters are cell selection and reselection parameters configured not according to the terminal capability parameter.

7. The method according to claim 1, wherein, setting different cell selection and reselection parameters according to a terminal capability comprises:

setting the at least two sets of cell selection and reselection parameters according to at least one of the following terminal capability parameters;

the terminal capability parameters comprise:

whether the terminal supports a carrier aggregation or not, frequency bands of carrier aggregation supported by the terminal, capability grades of the terminal, whether the terminal supports a dual connectivity or not, a version of a communication protocol supported by the terminal, whether the terminal supports multi-input and multi-output or not, categories of multi-input and multi-output supported by the terminal, frequency bands of multi-input and multi-output supported by the terminal, whether the terminal supports coordinated multi-point (COMP) transmission or not, whether the terminal supports a 3GPP/WLAN interoperation or not, whether the terminal is a special terminal defined in the communication protocol or not and whether the terminal has a special capability defined in the communication protocol.

8. The method according to claim 1, wherein the cell selection and reselection parameters are parameters defined in the communication protocol and for the cell selection and/or reselection by the terminal, and comprise at least one of the following:

a candidate frequency point list, a frequency point priority, a minimum receiving RSRP threshold, a minimum receiving RSRQ threshold, a higher priority selection threshold, a lower priority selection threshold, a speed state factor, a candidate cell list, a access barred cell list, cell access permission information, an offset aiming at a frequency point and an offset aiming at a cell.

9. A method for determining cell selection and reselection parameters, comprising:

receiving at least two sets of cell selection and reselection parameters;

selecting one set of cell selection and reselection parameters, which matches with a first terminal capability parameter, from the at least two sets of cell selection and reselection parameters as first cell selection and reselection parameters, wherein, the first terminal capability parameter is a terminal capability parameter of a terminal;

the first cell selection and reselection parameters are used for cell selection and/or reselection of the terminal, wherein the method further comprises:

receiving indication information, wherein the indication information is used for indicating the terminal capability parameter corresponding to each set of cell selection and reselection parameters; and selecting one set of cell selection and reselection parameters, which matches with a first terminal capability parameter, from the at least two sets of cell selection and reselection parameters as the first cell selection and reselection parameters comprises:

determining a second terminal capability parameter corresponding to each set of cell selection and reselection parameters according to the indication information; and matching second terminal capability parameters with the first terminal capability parameter, wherein, one set of cell selection and reselection parameters corresponding to the second terminal capability parameter which is in the second terminal capability parameters and successfully matches with the first terminal capability parameter, is the first cell selection and reselection parameters.

10. The method according to claim 9, wherein,
receiving at least two sets of cell selection and reselection parameters comprises:
receiving an RRC message; and
acquiring the at least two sets of cell selection and reselection parameters from the RRC message;
wherein, the RRC message is an RRC reconfiguration message, an RRC release message, an RRC connection establishment reject message or a system message.

11. The method according to claim 9, wherein,
the second terminal capability parameters and the first terminal capability parameter comprise at least one of:
whether the terminal supports a carrier aggregation or not, frequency bands of carrier aggregation supported by the terminal, capability grades of the terminal, whether the terminal supports a dual connectivity or not, a version of a communication protocol supported by the terminal, whether the terminal supports multi-input and multi-output or not, categories of multi-input and multi-output supported by the terminal, frequency bands of multi-input and multi-output supported by the terminal, whether the terminal supports coordinated multi-point (COMP) transmission or not, whether the terminal supports a 3GPP/WLAN interoperation or not, whether the terminal is a special terminal defined in the communication protocol or not and whether the terminal has a special capability defined in the communication protocol.

12. The method according to claim 9, wherein,
each set of cell selection and reselection parameters are parameters defined in a communication protocol and for the cell selection and/or reselection by the terminal, and comprises at least one of:
a candidate frequency point list, a frequency point priority, a minimum receiving RSRP threshold, a minimum receiving RSRQ threshold, a higher priority selection threshold, a lower priority selection threshold, a speed state factor, a candidate cell list, a access barred cell list, cell access permission information, an offset aiming at a frequency point and an offset aiming at a cell.

13. The method according to claim 9, wherein,
the method further comprises:
receiving default cell selection and reselection parameters, wherein the default cell selection and reselection parameters are cell selection and reselection parameters configured not according to the terminal capability parameter; and
when there is no cell selection and reselection parameters matching with the first terminal capability parameter in the at least two sets of cell selection and reselection parameters, selecting the default cell selection and reselection parameters as the cell selection and reselection parameters of the terminal.

14. A base station, comprising a processor and a memory, wherein the memory stores processor-executable programs, and the programs comprise:
a setting unit, configured to set at least two sets of cell selection and reselection parameters according to a terminal capability parameter; and
a sending unit, configured to send the at least two sets of cell selection and reselection parameters,
wherein, one set of cell selection and reselection parameters, which matches with the terminal capability parameter of a terminal, of the at least two sets of cell selection and reselection parameters is used for cell selection and/or reselection of the terminal,
wherein the setting unit comprises:
a first configuration module, configured to preset at least one piece of configuration index information, wherein each piece of configuration index information comprises at least one configuration index, and one configuration index corresponds to one terminal capability parameter;
a second configuration module, configured to preconfigure one set of cell selection and reselection parameters according to each piece of configuration index information; and
a determination module, configured to, when the terminal capability parameter corresponds to at least one or all configuration indexes in one piece of configuration index information, determine the one set of cell selection and reselection parameters corresponding to the configuration index information as one of the at least two sets of cell selection and reselection parameters;
wherein, the configuration index information is bitmaps; and one or more bits in each bitmap is the configuration index corresponding to one terminal capability parameter.

15. The base station according to claim 14, wherein,
the sending unit is configured to bear the at least two sets of cell selection and reselection parameters in an RRC message for sending;
wherein, the RRC message is an RRC reconfiguration message, an RRC release message, an RRC connection establishment reject message or a system message.

16. The base station according to claim 14, wherein,
the setting unit comprises:
a third configuration module, configured to preset one or more sets of cell selection and reselection parameters according to different terminal capability parameters or a terminal capability parameter set, wherein the terminal capability parameter set comprises at least one terminal capability parameter;
a storage module, configured to store a corresponding relation between the terminal capability parameters and the cell selection and reselection parameters in a communication protocol; and
a second determination module, configured to determine the at least two sets of cell selection and reselection parameters according to the communication protocol;
correspondingly,
the sending unit is configured to send the preconfigured at least two sets of cell selection and reselection parameters according to the communication protocol.

17. The base station according to claim 14, wherein the programs further comprise:
a forming unit, configured to form indication information, wherein the indication information is used for indicating the terminal capability parameter corresponding to each set of cell selection and reselection parameters; and
the sending unit is further configured to send the indication information.

18. The base station according to claim 14, wherein,
the sending unit sends default cell selection and reselection parameters, wherein,
the default cell selection and reselection parameters are cell selection and reselection parameters configured not according to the terminal capability parameter.

19. A terminal, comprising a processor and a memory, wherein the memory stores processor-executable programs, and the programs comprise:
a receiving unit, configured to receive at least two sets of cell selection and reselection parameters;

a selection unit, configured to select one set of cell selection and reselection parameters, which matches with a first terminal capability parameter, from the at least two sets of cell selection and reselection parameters as first cell selection and reselection parameters, wherein, the first terminal capability parameter is a terminal capability parameter of the terminal; and the first cell selection and reselection parameters are used for cell selection and/or reselection of the terminal, wherein the receiving unit is further configured to receive indication information, wherein the indication information is used for indicating the terminal capability parameter corresponding to each set of cell selection and reselection parameters; and the selection unit comprises:

a determination module, configured to determine a second terminal capability parameter corresponding to each set of cell selection and reselection parameters according to the indication information; and a matching module, configured to match second terminal capability parameters with the first terminal capability parameter, wherein, one set of cell selection and reselection parameters corresponding to the second terminal capability parameter which is in the second terminal capability parameters and successfully matches with the first terminal capability parameter, is the first cell selection and reselection parameters.

20. The terminal according to claim 19, wherein, the receiving unit comprises:

a receiving module, configured to receive an RRC message; and an acquisition module, configured to acquire the at least two sets of cell selection and reselection parameters from the RRC message;

wherein, the RRC message is an RRC reconfiguration message, an RRC release message, an RRC connection establishment reject message or a system message.

21. The terminal according to claim 19, wherein, the receiving unit is further configured to receive default cell selection and reselection parameters; and the selection unit is further configured to, when there is no cell selection and reselection parameters matching with the first terminal capability parameter in the at least two sets of cell selection and reselection parameters, select the default cell selection and reselection parameters as the cell selection and reselection parameters of the terminal.

* * * * *